Figure 1:
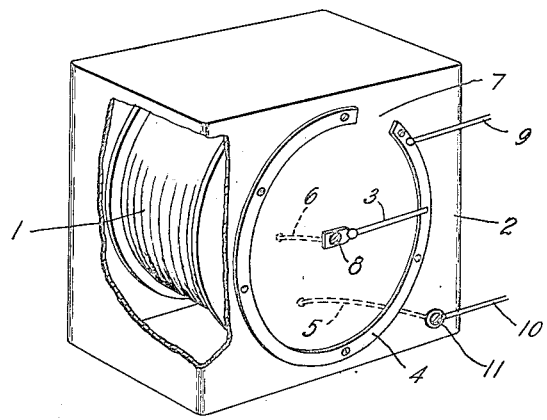

March 22, 1932.   W. L. CASPER   1,850,579
ADJUSTABLE INDUCTANCE COIL
Filed July 11, 1928

INVENTOR
WILLIAM L. CASPER
BY
J. R. Burgess
ATTORNEY

Patented Mar. 22, 1932

1,850,579

UNITED STATES PATENT OFFICE

WILLIAM L. CASPER, OF SUMMIT, NEW JERSEY, ASSIGNOR TO BELL TELEPHONE LABORATORIES, INCORPORATED, OF NEW YORK, N. Y., A CORPORATION OF NEW YORK

ADJUSTABLE INDUCTANCE COIL

Application filed July 11, 1928. Serial No. 291,932.

This invention relates to inductance coils and particularly to those which are capable of being adjusted within a small percentage range of their mean inductance value.

There are many instances in the signaling art where coils are required having precise values of inductance. As an example of such an instance, filters may be mentioned, particularly those of the band pass type, where the accuracy of frequency placement is largely dependent upon the precision with which the capacity and inductance of the individual filter elements can be built and maintained.

In the determination of the specific values of inductance and capacity for filter elements, it is necessary to consider the effect of the elements upon each other due to their relative positions in the filter, the effect of shielding, the effect of inter-element cabling, etc. When these many effects are taken into consideration it is possible to specify values of inductance and capacity which will enable the filter cut-off points to be sharply defined. However, when fixed inductances and capacities are used some difficulties arise in attempting to obtain the desired accuracy in the filter cut-off points as for instance manufacturing considerations which necessitate certain tolerances in inductance values above and below the nominal inductance value of the coil.

The error which might be introduced due to a departure of the coil from its nominal inductance value may be partially eliminated by adjusting the inductance element to resonance with the particular condenser with which it is to be associated in the filter instead of by itself as has heretofore been the practice. The advantages of this method as compared with adjustment of individual elements lie partly in the elimination of certain bridge errors, partly in the fact that the condensers used can be built with greater accuracy than the individual coils and finally that in the adjustment of a coil to resonance with a particular condenser there may be a tendency to offset the error of the condenser by an opposing error in the inductance coil.

Departures from the nominal inductance value of coils may be compensated and the greatest advantage derived from this method of testing if the coils are made variable within a range of plus and minus a small percentage of their nominal inductance value. To secure further accuracy testing devices simulating field conditions may be used. For instance, the effect of shielding may be taken into consideration by testing and adjusting the inductance elements under the conditions of use. A simple method of doing this is to mount the coils and condensers on the panel which is to be used permanently, or on a similar panel, and to locate the panel accurately in a dummy shield which may be built to resemble as near as possible the shielded conditions which will be encountered later in the field. The coils and condensers may be measured and the coils adjusted under these conditions. If the filter elements are connected by cable similar to that which will be used ultimately, a further source of error may be eliminated.

An object of this invention is to adjust the inductance of a coil to a precise value, a variable range of plus and minus a small percentage of its nominal inductance value being provided.

Among the features of the invention is an inductance element which has means for adjusting its inductance to a precise value and for thereafter locking the means so as to make the adjustment in effect permanent.

Another feature of the invention resides in means external of the coil casing which enables the inductance of a potted encased coil to be increased or decreased by an amount greater or less than one complete turn of the coil.

Still another feature of the invention resides in a solenoidal type coil mounted upon a spindle. A spiral comprising a plurality of turns of wire is associated with the coil and a terminal is provided so that as the coil is rotated upon the spindle the terminal slides along the spiral to add to or subtract from the inductance of the main coil.

Figure 2:
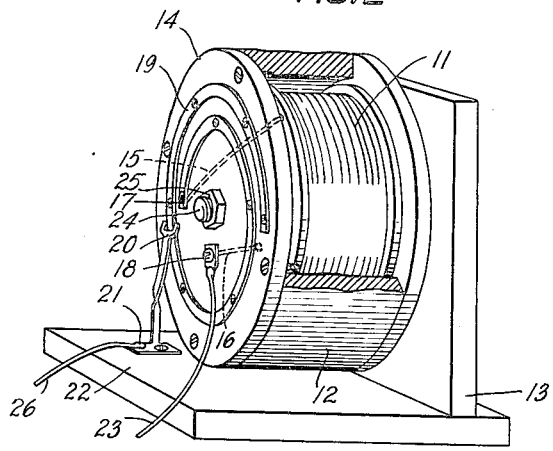
Figure 3:
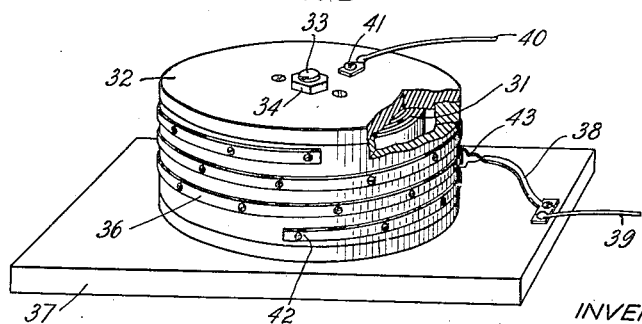

A better understanding of the invention may be had by reading the following description, together with the attached drawings, of which Figs. 1, 2 and 3 show perspective views of devices for adjusting the inductance of an encased coil by means external of the case.

Referring to Fig. 1, a coil 1, the inductance of which is to be adjusted to some precise value, is positioned within a casing 2 made of bakelite or some other suitable material. The coil is potted with some impregnating compound to prevent the access of moisture thereto and, under ordinary circumstances, when the coil is assembled it is not thereafter removed from the casing.

A portion of the casing has been removed to show the manner in which the coil is placed in the casing with respect to the external adjusting means.

In this embodiment of the invention the adjusting means are located external of the casing, as shown. A conducting ring 4, split at one point 7, is securely fastened to the case and is magnetically coupled with the winding of the coil 1. One end of the winding is connected to a terminal 11 to which an external lead 10 may be connected. The other external lead 9 is connected to the ring 4 at the split 7. The other end of the winding 1 is connected to the contact arm 3 by the lead 6 in some suitable manner as for instance by means of the terminal 8. The arm 3 is adapted to be moved along the ring 4, to vary the amount of the ring in series with the coil, thus providing a range of adjustment equivalent to approximately one turn of the coil.

To adjust the inductance of the coil the arm 3 may be moved along the ring 4 until proper tests indicate that the precise value of inductance has been obtained. The arm 3 may then be soldered to the ring to provide a permanent connection so that a coil results having the desired value of inductance, irrespective of manufacturing inaccuracies or effects produced by its environment.

Fig. 2 shows another embodiment of the invention involving the same principle, but which lends itself more readily to adjustment than that shown in Fig. 1. In this figure a coil 11, suitably wound, is mounted in a casing made from material similar to that mentioned in connection with Fig. 1. The coil and casing comprise an integral unit rotatably mounted upon a spindle 24, which is supported by a suitable standard 13. As in Fig. 1, the ends of the coil are connected by the leads 15 and 16 to the inductance adjusting means mounted externally on the case cover 14, which is firmly secured in position when assembled. Leads 23 and 26 are provided for connecting the coil in the circuit with which it is to be associated. The lead 23 is directly connected to the terminal 18. The lead 26 is permanently attached to a flexible conductor arm 20, which is attached to the base panel 22. The flexible arm 20 has sufficient resiliency to maintain it in close contact with the spiral conductor 19, which is fastened on the face of the coil casing.

In order to adjust the inductance of the coil to its proper value the means which fastens the lead 23 to the terminal 18 and the nut 25 which screws upon the end of the spindle 24 are loosened. By rotating the coil casing and the coil integrally therewith the arm 20 is caused to slide with respect to the spiral 19, thereby varying the length of the spiral which is in series with the coil. In this manner sufficient inductance may be added to or substracted from the coil until the proper value is obtained. When this is reached, the arm 20 may be permanently connected to the spiral by soldering and the screw 18 and the nut 25 retightened. This method of adjustment is simple and can always be accomplished without disturbing the impregnated coil. A balanced or two winding coil could be similarly adjusted by providing a spiral on both ends of the coil casing.

Another adaptation of the invention is shown in Fig. 3 wherein the impregnated coil 31 is encased in and is integral with the casing 32, which is rotatably mounted on the vertical spindle 33. A suitable base 37 is provided for mounting the coil. Similarly to the embodiments shown in Figs. 1 and 2 the respective ends of the coil are brought to the terminal 41 and one end 42 of the spiral 36 which is mounted on the periphery of the casing. One lead 40 is connected to the coil terminal 41 and is fastened by means of a screw. The other lead 39 is permanently attached to the resilient conducting member 38, on which in turn is a contact in slidable relation with the spiral 36. The contact is shown at 43. As in Fig. 2, the inductance value of the coil is adjusted to its proper value with a high degree of accuracy by loosening the screw 41 and the nut 34 and rotating the coil until enough of the spiral is in series with the coil to give the value of inductance desired. All the embodiments described herein provide the simple method of continuously varying the inductance of a solenoidal coil over its entire adjustable range without having access to the coil winding itself.

Many methods of accomplishing the above result will be suggested to those skilled in the art within the spirit of the invention, which is to be limited therefore only by the scope of the appended claims.

What is claimed is:

1. An inductance unit comprising an encased solenoidal coil, means external of said coil casing for adjusting the inductance of said unit continuously over a range equivalent to a small percentage of its nominal inductance value, said means comprising a turn of conducting material magnetically coupled with the turns of said coil and in series therewith, and means for continuously varying the amount of said turn in series with said coil until the inductance is adjusted to the desired value.

2. As an article of manufacture an inductive winding, a casing enclosing said winding, terminals for said winding mounted on said casing, and an auxiliary continuously adjustable winding mounted on said casing and connected between said first winding and said terminals for permitting adjustment of the total inductance between said terminals.

3. The combination with a coil sealed in a casing having terminals on the outside of said casing for connection to an external circuit of means external to said casing comprising relatively movable parts operable while said coil is connected in circuit for continuously adjusting the total inductance between said terminals within a small percentage of its mean value, and means for securing said parts against relative movement once said adjustment has been effected.

4. In the manufacture of shielded apparatus incorporating one or more coils of fixed and accurate inductance value, the method of comprising mounting such coil in a position within a test shield such as to simulate electrically both as to relative position of parts and shielding effects the condition of use of the coil in said apparatus, precisely adjusting the inductance of said coil to its required value when so mounted, fixing the adjustment at such required value and thereafter transferring the coil from the test shield to its position in said apparatus without change in adjustment.

In witness whereof, I hereunto subscribe my name this 7th day of July, 1928.

WILLIAM L. CASPER.